Dec. 31, 1946.　　C. W. HEWLETT　　2,413,565
VAPOR PRESSURE MEASUREMENT
Filed June 15, 1945
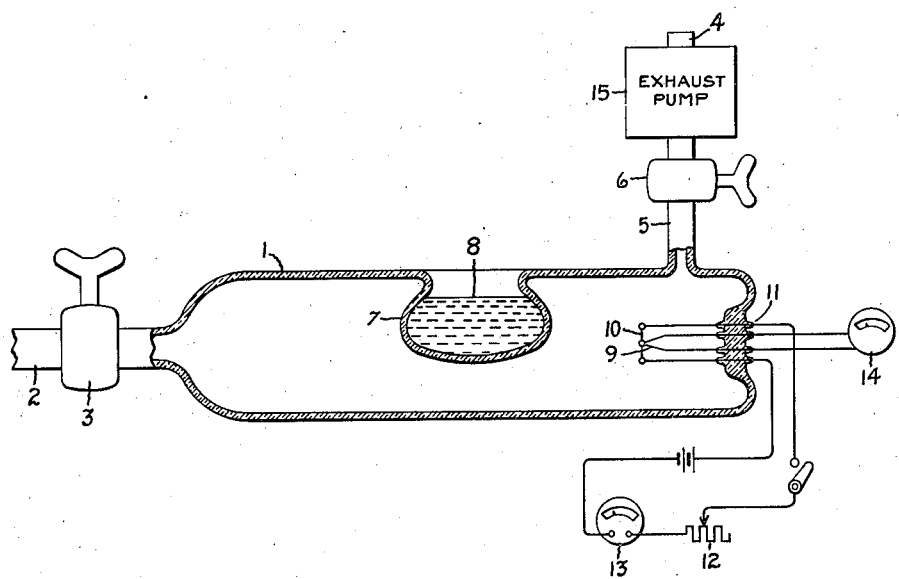
Inventor:
Clarence W. Hewlett,
by *Prowell P. Mack*
　　His Attorney.

Patented Dec. 31, 1946

2,413,565

UNITED STATES PATENT OFFICE 2,413,565

VAPOR PRESSURE MEASUREMENT

Clarence W. Hewlett, Marblehead, Mass., assignor to General Electric Company, a corporation of New York Application June 15, 1945, Serial No. 599,588

3 Claims. (Cl. 73—29)

My invention relates to a method of and apparatus for measuring small vapor pressures such for example as the vapor pressure of the atmosphere at a low temperature such as minus 50 degrees centigrade.

In carrying my invention into effect, I entrap a sample of the atmosphere or other gas whose vapor pressure is to be determined in an airtight vessel. I then condense all of the moisture in such vessel by lowering the temperature to minus 186 degrees or thereabout where all moisture will be condensed. Then while the low temperature is maintained, I exhaust all of the air or other gas from the vessel and again seal it. Then the vessel and contents are raised to room temperature. This causes any condensed liquid in the vessel to vaporize to establish a pressure within the vessel. This pressure is to be measured and it is the same as the partial pressure of the vapor in the air or other gas previously introduced into the vessel. This vapor pressure is then measured by a vacuum gauge. By the term "vapor pressure" here used I do not mean to imply necessarily the "saturation vapor pressure" of water or other liquid corresponding to a definite temperature, but simply the partial pressure of the vapor present, whether or not the air or other gas is saturated with the vapor. The temperature of the air or other gas may be measured when it is introduced in the vessel. Then, using the vapor pressure that has been measured as above and taking the data from published tables for the saturation vapor pressure at the known temperature, the relative humidity of the air or other gas may be calculated. Simple apparatus by means of which this method of vapor pressure measurement may be carried out is illustrated in the drawing. The features of my invention which are believed to be novel and patentable will be pointed out in the claims appended hereto.

For a better understanding of my invention, reference is now made to the drawing which shows an air-tight vessel 1 which may be made of annealed glass so as to withstand rapid and wide changes in temperature. The vessel has an inlet opening 2 which may be sealed with a valve 3 and an outlet opening 4 which may be sealed with a valve 5. In order to cool the vessel and contents so as to condense any moisture therein, I have provided the vessel with a central depression or cup 7 in its upper surface into which liquid air 8 may be poured. For measuring the vapor pressure within the vessel, I have provided a thermocouple 9 and heater 10 in the vessel having lead-in wires sealed through the wall of the vessel at 11. The heater wire 10 is arranged to be connected to a source of supply through an adjustable resistance 12 and an ammeter 13, by means of which a predetermined amount of heat energy may be supplied to the thermocouple. The thermocouple 9 is connected to a sensitive millivolt meter 14 by means of which the temperature of the thermocouple 9 may be ascertained. The rate of heat transfer between the thermocouple and the walls of vessel 1, and hence the temperature attained by the thermocouple for a given rate of heat energy supply thereto will depend upon the vapor pressure.

The electrical output of the thermocouple is therefore a function of the vapor pressure and the indications of the millivolt meter may be calibrated as a separate operation in terms of vapor pressure. This having been done, the indication of the millivolt meter will give directly the value of the vapor pressure in the vessel. Thus the saturation vapor pressure for water for −60, −50, and −40 degrees centigrade is given in the Smithsonian tables as 8, 30, and 97 microns. If then the vapor pressure measured is 10 microns and the temperature of the air from which the sample was drawn as −50° C., the relative humidity would be $$\frac{10}{30}100 = 33\tfrac{1}{3}\%$$

The operation of the apparatus of Fig. 1 is as follows: Valves 3 and 6 are opened and a sample of the gas to be investigated is drawn into the vessel 1 as by operation of a vacuum pump 15 coupled with the outlet 5. Operation of pump 15 should continue long enough to be sure that a good sample has been obtained and that the temperature of the vessel 1 corresponds to the gas under investigation. Valve 6 is then closed, followed by closure of valve 3. The reentrant receptacle 7 is now filled with liquid air which cools the vessel 1 and contents, causing all of the moisture therein to condense. Valve 6 is now opened and all of the air in vessel 1 exhausted. During this exhausting operation the vessel 1 is kept at a very low temperature by adding more liquid air at 8, if necessary, so that none of the condensed moisture in the vessel will vaporize and be carried out. After the vessel 1 is thus evacuated, valve 6 is closed and the vessel 1 is raised to a known room temperature, say 20 degrees C., where all the moisture therein will vaporize, creating a vapor pressure within the vessel 1 proportional to the moisture content.

This pressure is then measured with the vacuum gauge previously described.

The method and apparatus described may of course be used for measuring vapors other than water vapor, for example CO, $CO_2$, ether, acetone, and other paint and varnish solvents, etc. For some vapors other refrigerants than liquid air might be used, such as solid $CO_2$ in acetone.

What I claim as new and desire to secure by Letters Patent of the United States is:

1. The method of measuring vapor pressure in a gas which consists in sealing a sample of the gas in a container, lowering the temperature of the container and sample to a value sufficiently low as to condense all of the moisture in the sample, exhausting the container of gas while maintaining the container at such low temperature, sealing the container again, then raising the temperature of the container to a known temperature where all of the moisture therein is vaporized, and then measuring the pressure of the vapor in the container at the last mentioned temperature.

2. Apparatus for measuring vapor pressure comprising a container having at least one outlet, means for sealing said outlet, said container having a reentrant depression or cup in its central upper wall into which sufficient liquid air or the like may be poured to cool the container and its contents to a temperature where all vaporized moisture contained therein will be condensed, means for exhausting said container of gas, and means for measuring the vapor pressure within said container including a thermocouple and an electric heater therefor within said container with leads thereto sealed through the wall of the container.

3. Apparatus for use in measuring the vapor pressure of a gas at low temperatures, comprising an air-tight container provided with inlet and outlet openings, valves for sealing said openings, said container having a central depression or cup in its upper wall centrally of the container into which a sufficient amount of liquid air may be contained to cool the container and its contents to a temperature where all moisture therein will condense, and a thermocouple and an electric heater for said thermocouple within said container having electrical connections sealed through the wall of said container adapted for use in measuring the vapor pressure within said container.

CLARENCE W. HEWLETT.